United States Patent
Grillo et al.

(10) Patent No.: US 7,305,038 B2
(45) Date of Patent: Dec. 4, 2007

(54) PERIPHERAL DEVICE RECEIVER DETECTION IN A HIGH NOISE ENVIRONMENT

(75) Inventors: Donald C. Grillo, Lakeville, MN (US); Prashant Singh, Eden Prairie, MN (US)

(73) Assignee: LSI Corporation, Milpitas, CA (US)

( * ) Notice: Subject to any disclaimer, the term of this patent is extended or adjusted under 35 U.S.C. 154(b) by 896 days.

(21) Appl. No.: 10/328,764

(22) Filed: Dec. 23, 2002

(65) Prior Publication Data

US 2004/0119495 A1 Jun. 24, 2004

(51) Int. Cl.
*H04B 3/00* (2006.01)

(52) U.S. Cl. .................. 375/257; 375/222; 326/21; 324/118; 710/300

(58) Field of Classification Search .......... 375/222, 375/257; 324/118; 326/21; 710/300–304
See application file for complete search history.

(56) References Cited

U.S. PATENT DOCUMENTS

| | | | |
|---|---|---|---|
| 5,317,697 A | 5/1994 | Husak et al. ............... 395/325 |
| 5,530,302 A | 6/1996 | Hamre et al. ............... 307/147 |
| 5,535,087 A * | 7/1996 | Puckett et al. .............. 361/118 |
| 5,613,130 A | 3/1997 | Teng et al. .................. 395/750 |
| 5,714,809 A | 2/1998 | Clemo ........................ 307/125 |
| 5,754,797 A | 5/1998 | Takahashi ................... 395/283 |
| 5,768,541 A | 6/1998 | Pan-Ratzlaff .............. 395/283 |
| 5,784,576 A | 7/1998 | Guthrie et al. ............... 395/283 |
| 5,809,256 A | 9/1998 | Najemy ....................... 395/283 |
| 5,951,659 A | 9/1999 | McElroy et al. ............. 710/101 |
| 5,951,660 A | 9/1999 | Van Wonterghem ........ 710/103 |
| 5,973,419 A | 10/1999 | Kruppa et al. .............. 307/131 |
| 5,996,035 A | 11/1999 | Allen et al. .................. 710/103 |
| 6,170,029 B1 | 1/2001 | Kelley et al. ............... 710/103 |
| 6,229,334 B1 | 5/2001 | Kelley et al. .................. 326/30 |
| 6,247,080 B1 | 6/2001 | Wallach et al. ............. 710/103 |
| 6,286,066 B1 | 9/2001 | Hayes et al. ................ 710/103 |
| 6,311,242 B1 | 10/2001 | Falkenburg et al. ........ 710/103 |
| 6,336,591 B1 | 1/2002 | Staples et al. .............. 235/487 |
| 6,353,523 B1 | 3/2002 | Niv et al. ....................... 361/79 |
| 6,470,026 B1 | 10/2002 | Pearson et al. .............. 370/463 |
| 6,650,635 B1 * | 11/2003 | Weinstein et al. ........... 370/352 |
| 6,771,478 B2 * | 8/2004 | Ochi ............................ 361/118 |
| 6,868,468 B2 * | 3/2005 | Boz et al. .................... 710/304 |
| 7,010,640 B2 * | 3/2006 | Hoshino et al. ............. 710/313 |
| 2002/0131220 A1 | 9/2002 | Li ................................. 361/56 |

* cited by examiner

*Primary Examiner*—Temesghen Ghebretinsae
*Assistant Examiner*—Juan Alberto Torres
(74) *Attorney, Agent, or Firm*—Westman, Champlin & Kelly

(57) ABSTRACT

A peripheral device includes a data port having high and low impedance terminations, a transmitter having a data signal generator and a receiver detector. The data signal generator is electrically coupled to the low impedance termination of the data port when in a low impedance operating mode, and to the high impedance termination when in a high impedance operating mode. The receiver detector includes a noise detector adapted to detect a presence or an absence of rail-to-rail noise at the data port when the transmitter is in the high impedance operating mode.

18 Claims, 5 Drawing Sheets

PERIPHERAL DEVICE RECEIVER DETECTION IN A HIGH NOISE ENVIRONMENT

FIELD OF THE INVENTION

The present invention is generally related to computer systems utilizing peripheral devices and, more particularly, to peripheral device receiver detection in a high noise environment.

BACKGROUND OF THE INVENTION

Computer systems typically include expansion connectors for the addition of peripheral devices to extend and enhance the function of the computer system. Examples of such peripheral devices include modems, network cards, adapter cards, Compact Discs (CD's), and Digital Video Discs (DVD's) drives, Random Access Memory (RAM), data storage devices, and sound devices. Such peripheral devices are typically formed in accordance with an industry standard specification that governs the physical connection to the computer system through a data port or slot, and the data bus over which communications with the peripheral device are conducted.

Some industry standard specifications allow for the insertion and removal of the peripheral devices while the computer system is running without damaging the computer system or peripheral device. This "hot swapping" of the peripheral device is particularly desirable in computer systems that are required to operate continuously, such as communication network controllers, servers, gateways, routers, and the like. One such industry standard specification is the Peripheral Component Interconnect Express (PCI-X) specification. Like its predecessor, the Peripheral Component Interconnect (PCI) specification, the PCI-X specification enables high-speed communication between compatible peripheral devices and the central processing unit (CPU) of the computer system. In a PCI-X device pair, data is communicated between a transmitter of one PCI-X device and a receiver of another PCI-X device over a transmission line, to which data port terminations of the transmitter and receiver are capacitively coupled.

The hot swapping function accommodated by the PCI-X specification makes it necessary for a transmitter of one PCI-X device to check to determine whether the corresponding receiver of the peripheral device it wishes to communicate with is present. This is accomplished by periodically performing a receiver detect function. The receiver detect function generally involves comparing a voltage at the data port termination of the transmitter to a reference voltage. The corresponding receiver is determined to be present when the voltage at the data port is above the reference voltage after a predetermined period of time.

Additionally, it is necessary to provide protection from electrostatic discharge (ESD) where static charge builds on the transmission line and is discharged through a peripheral device when it is connected to the transmission line. This discharge could be large and could damage the peripheral components. One manner in which ESD protection is provided is by switching the termination of the data port of the transmitter into a high impedance state, once it is determined that the receiver is absent, to reduce the magnitude of the discharge that could occur when the receiver is reconnected. Unfortunately, this ESD protection scheme can give rise to high amplitude noise at the high impedance data port termination of the transmitter, which can interfere with the implementation of the receiver detect function. As a result, false detections of the receiver can occur resulting in data miscommunications.

SUMMARY

The present invention provides a solution to the problem of performing receiver detection in a high noise environment. One aspect of the invention is directed to a peripheral device for use in a computer system that includes a data port having high and low impedance terminations, and a transmitter having a data signal generator and a receiver detector. The data signal generator is electrically coupled to the low impedance termination of the data port when in a low impedance operating mode, and electrically coupled to the high impedance termination when in a high impedance operating mode. The receiver detector includes a noise detector adapted to detect a presence or an absence of rail-to-rail noise at the data port when the transmitter is in the high impedance operating mode. The rail-to-rail noise includes a high frequency electrical signal having a voltage that substantially extends from proximate a high rail voltage to proximate a low rail voltage.

Another aspect of the present invention is directed to a method of detecting an electrical connection between a data port of a transmitter of a peripheral device to a receiver when the data port is in a high impedance operating mode. The method includes detecting a presence of rail-to-rail noise at the data port. The detection of the rail-to-rail noise indicates that the receiver is absent.

Other features and benefits that characterize embodiments of the present invention will be apparent upon reading the following detailed description and review of the associated drawings.

DETAILED DESCRIPTION OF THE PREFERRED EMBODIMENTS

Figure 1:
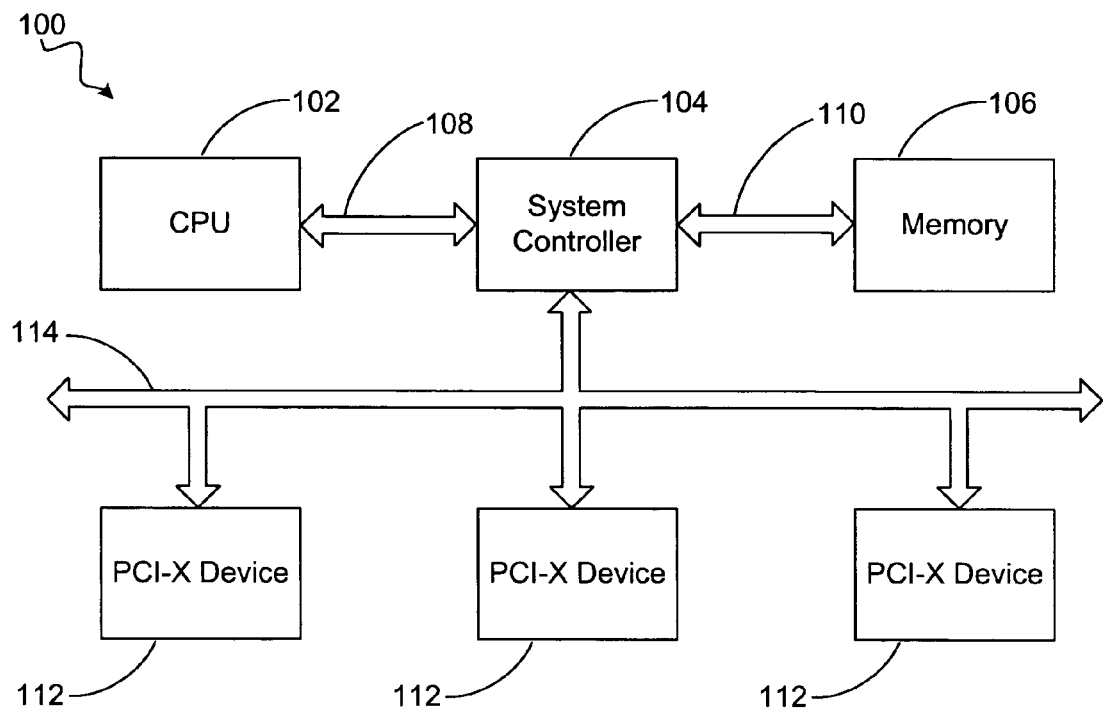
FIG. 1 is a schematic diagram of a computer system with which embodiments of the present invention may be used.

FIG. 1 is a schematic diagram of a computer system 100 that is configured to operate in accordance with the Peripheral Component Interconnect Express (PCI-X) specification. Computer system 100 includes a CPU 102, a system controller 104, and system memory 106. The CPU 102 is linked to the system controller 104 by a high-speed CPU bus 108. The system controller 104 is, in turn, linked to the system memory 106 through a memory bus 110. Computer system 100 also includes various peripheral devices 112 in accordance with the present invention that are linked to the system controller 104 through a bus 114. The peripheral devices 112 and the bus 114 are preferably formed in accordance with the PCI-X specification. Additional bus architectures such as a slower Industry Standard Architecture (ISA) and a Small Computer Systems Interface (SCSI) bus architecture (not shown) can also be used in the computer system 100.

Figure 2:
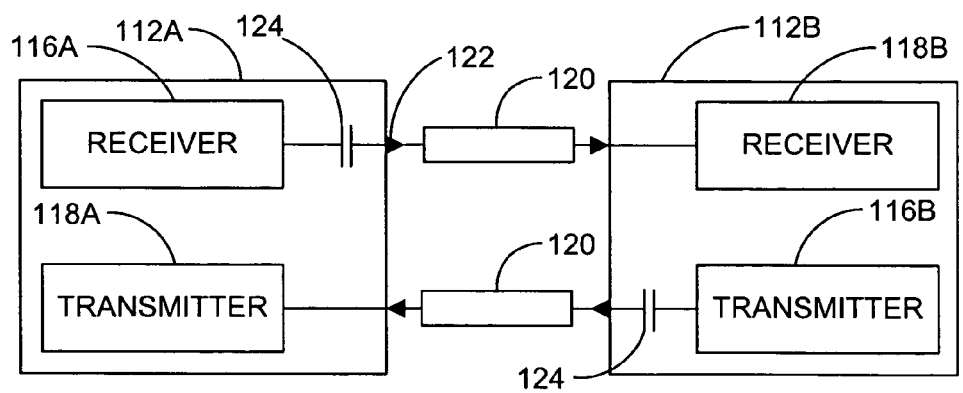
FIG. 2 is a schematic diagram of a peripheral device pair.

PCI-X devices 112 can include both a transmitter, generally referred to as 116, and a receiver, generally referred to as 118. FIG. 2 is a schematic diagram depicting a PCI-X peripheral device pair 112A and 112B. Data is communicated between a transmitter 116A of device 112A and a receiver 118B of another device 112B over a transmission line 120. Further, data can be communicated between a transmitter 116B of device 112B and a receiver 118A of device 112A over transmission line 120. As shown in FIG. 2, the transmitters 116A and 116B are capacitively coupled to the transmission lines 120 through capacitor 124 (e.g., 100 nF) at the data port termination 122, in accordance with the PCI-X specification.

PCI-X devices 112 can include both a transmitter 116 and a receiver 118, as shown in the schematic diagram of FIG. 2 depicting a PCI-X peripheral device pair 112A and 112B. Data is communicated between the transmitter 116A of device 112A and a receiver 118B of another device 112B over a transmission line 120. The transmitter 116A is capacitively coupled to the transmission line 120 through a capacitor 124 (e.g., 100 nF) at the data port termination 122, in accordance with the PCI-X specification.

Figure 3:
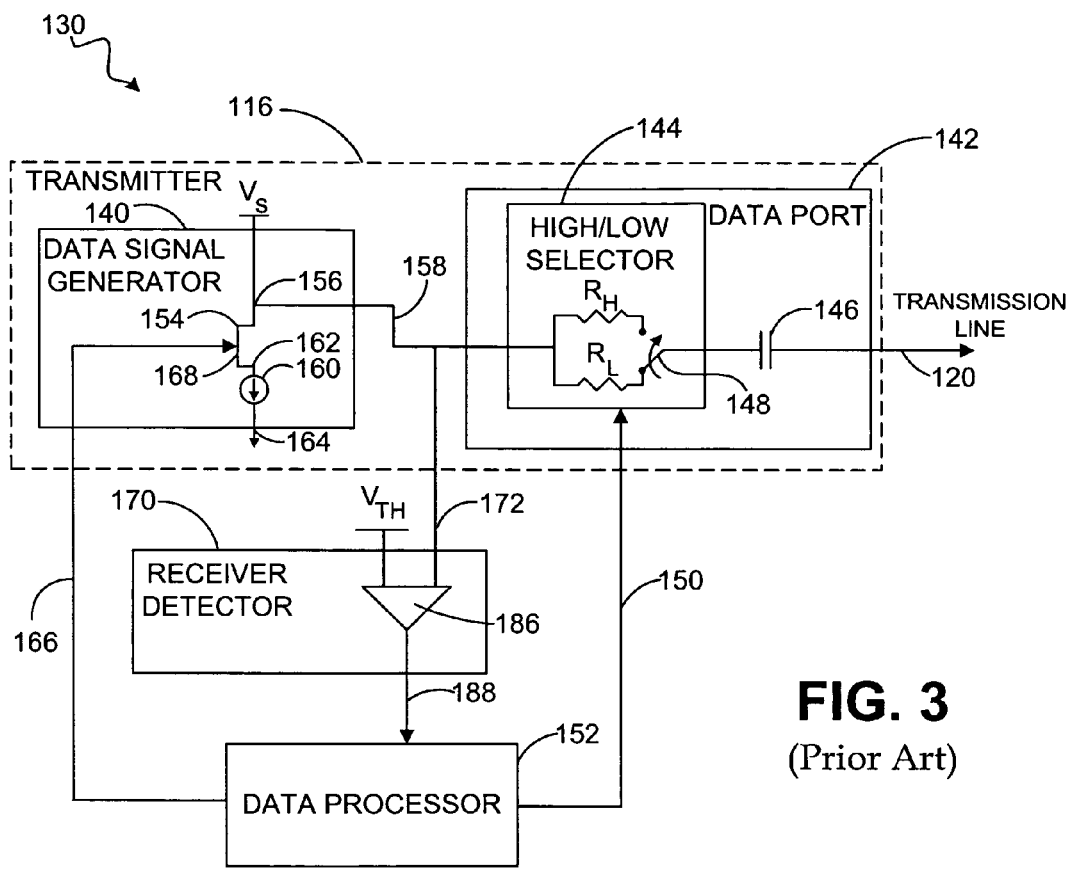
FIG. 3 is a schematic diagram of a peripheral device in accordance with the prior art.

FIG. 3 is a schematic diagram depicting a PCI-X device 130 in accordance with the prior art. Only the transmitter 116 and related components are depicted to simplify the figure and the discussion of the device 130. The transmitter 116 includes a data signal generator 140 and a data port 142 that is adapted to couple to the transmission line 120 (FIG. 2) for communication with a corresponding receiver 118 of another PCI-X device 112.

The data signal generator 140 generally includes a transistor 154 having an output terminal 156 coupled to a supply voltage $V_S$ and to a high/low impedance termination selector 144 through line 158. A current source 160 is placed between a transistor terminal 162 and a common voltage 164 to bias the transistor 154 into the active region. The data processor 152 controls the data signal generator 140 using a data control signal 166 that is electrically coupled to the gate 168 of the transistor 154. The data signal generator 140, in response to the data control signal 166, produces data signals on line 158 in the form of a voltage ranging from the supply voltage $V_S$ (typically 1.2 volts) and the common voltage 164 (0 volts) in accordance with known methods.

The data port 142 includes a capacitor 146 (e.g., 100 nF), which capacitively couples transmitter 116 to transmission line 120. High/low impedance termination selector 144 selectively electrically couples the data signal generator 140 to the transmission line 120 through a high impedance termination $R_H$ (e.g., greater than 5 kilo-ohms) when in a high impedance operating mode, and electrically couples the data signal generator 140 to the transmission line 120 through a low impedance termination $R_L$ (e.g., 50 or 75 ohms) when the transmitter 116 is in a low impedance operating mode. The selection between the high and low operating modes is made by a switch 148 that is under control of an impedance mode signal 150 from the data processor 152.

During normal communication between the transmitter 116 and a corresponding receiver coupled to the transmission line 120, the data processor 152 places the transmitter 116 in the low impedance operating mode. The low impedance termination $R_L$ matches the impedance of the data port termination 122 of the receiver 118 of the corresponding PCI-X device for low signal loss communication there between, in accordance with the PCI-X specification.

Due to the hot swapping capability of the device 130, transmitter 116 must periodically perform a receiver detect function to ensure that the receiver 118 of the device it wishes to communicate with is present or attached to the transmission line 120 to prevent data miscommunication therebetween. The receiver detect function is generally performed by a receiver detector 170. In general, the receiver detect function of the prior art involves monitoring a voltage of a receiver detect signal at line 158 through line 172 following a resetting of the data signal generator 140. The data processor 152 can control the resetting of the data signal generator 140 and the generation of the receiver detect signal in a variety of ways. One method is to terminate data communication and turn off the current source 160.

Figure 4:
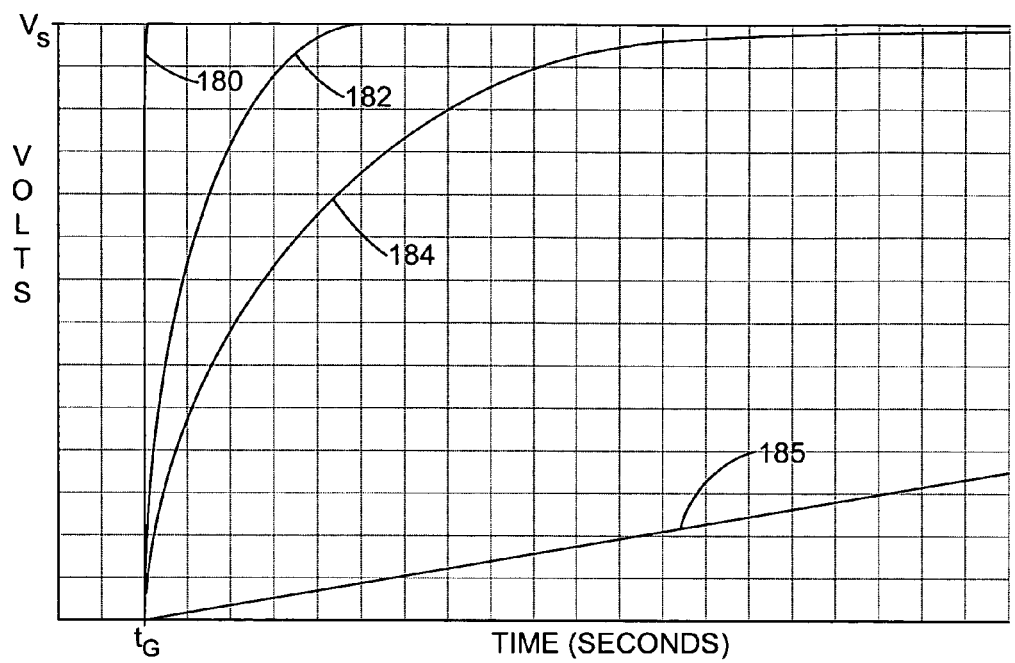
FIG. 4 is a chart illustrating the behavior of a voltage at a data port of a transmitter of a peripheral device in accordance with various configurations.

FIG. 4 is a chart illustrating the behavior of the receiver detect signal at line 158 over time following the resetting of the data signal generator 140 in accordance with various configurations. Lines 180 and 182 respectively represent the receiver detect signal when a receiver 118 is disconnected and connected to the transmission line 120 and when the transmitter 116 is in the low impedance operating mode. Lines 184 and 185 respectively represent the receiver detect signal when a receiver 118 is disconnected and connected to the transmission line 120 and when the transmitter 116 is in the high impedance operating mode. Clearly, the receiver detect signal rises more quickly to the supply voltage $V_S$ when the corresponding receiver 118 is absent or disconnected from the transmission line 120.

The receiver detect function or method performed by the receiver detector 170 determines whether the receiver 118 is present or absent by determining whether the receiver detect signal has a voltage that is greater than a threshold voltage $V_{TH}$ after a predetermined period of time T has expired following the generation of the receiver detect signal at a time $t_G$ (FIG. 4). The threshold voltage $V_{TH}$ and the time T are selected such that the voltage at the output terminal 156 or line 158 after the expiration of the time T, is determinative of whether the receiver 118 is present or absent. For example, after the time T has expired, it is known that the receiver 118 is absent when the voltage of the receiver detect signal is greater than the threshold voltage $V_{TH}$, and it is known that the receiver 118 is present when the voltage of the receiver detect signal is less than the threshold voltage $V_{TH}$. This function is performed by a comparator 186 that provides an output signal 188 to the data processor 152 that is indicative of the result of the comparison of the threshold voltage $V_{TH}$ and the voltage at line 158, as shown in FIG. 3. The data processor 152 can then use the output signal 188 to determine whether data communications should proceed.

When it is determined that the receiver 118 is present, the transmitter 116 can resume data communication therewith while operating in the low impedance mode. On the other hand, if it is determined that the receiver 118 is absent, the transmitter 116 is placed in the high impedance operating mode. The device 130 then periodically performs the receiver detect function using receiver detector 170 to determine whether a receiver 118 becomes connected to the transmission line 120.

The purpose of placing transmitter 116 in the high impedance operating mode is to protect a receiver 118 from electrostatic discharge (ESD) when it is connected to the transmission line 120. The receivers of PCI-X devices generally include transistors having extremely thin oxide and insulating layers that can be easily damaged by receiving relatively small currents driven by a moderate voltage, such as that produced by electrostatic charge that accumulates on the transmission line 120 while the receiver 118 is absent. Without proper protection, the electrostatic charge on the transmission line 120 could discharge through a susceptible electronic component when the receiver 118 of the peripheral device is reconnected to the transmission line 120. The high impedance operating mode of the transmitter 116 slows the discharge of the electrostatic charge through the receiver 118 to a safe rate (low current) when it is reconnected to the transmission line 120, such that damage to the delicate electronics of the receiver 118 is avoided.

Unfortunately, this ESD protection scheme has a key shortcoming. The placement of the transmitter 116 in the high impedance operating mode when the receiver 118 is absent, results in the transmission line 120 having a high impedance termination at the transmitter 116 and an open circuit at the disconnected end. This causes the transmission line 120 to behave like a lightly damped RLC tank circuit, which is susceptible to resonant coupling of noise therein.

Figure 5:
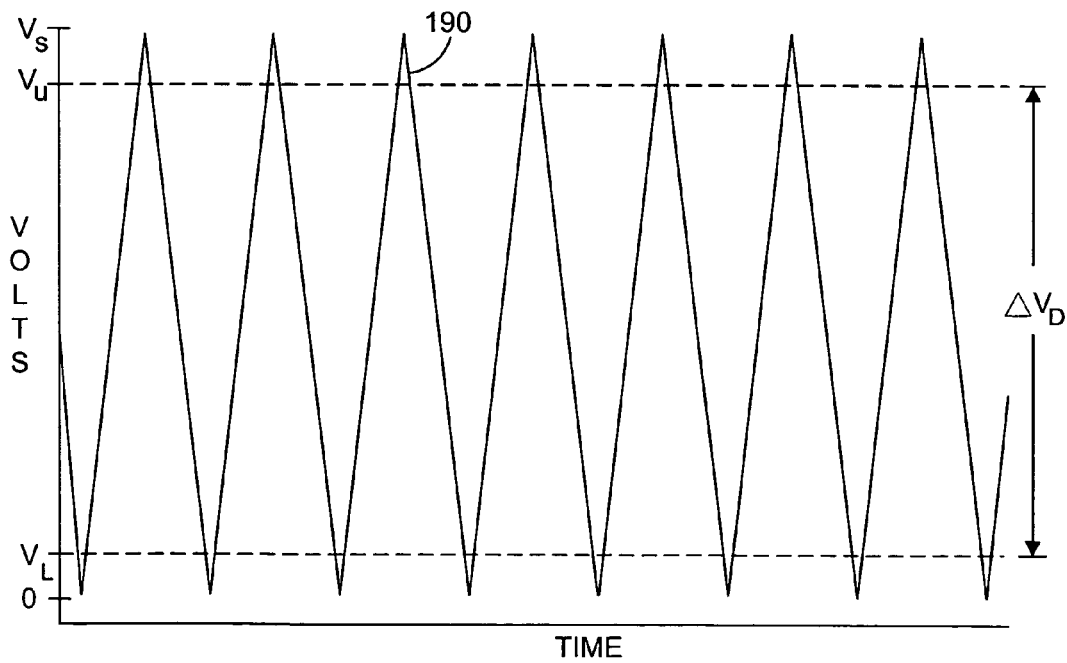
FIG. 5 is a chart illustrating an example of rail-to-rail noise at a data port of a transmitter of a peripheral device when operating in a high impedance mode and when a corresponding transmitter is absent.

Noise coupling at a resonant or noise frequency (e.g., approximately 200 MHz) of the tank circuit can give rise to high amplitude noise at the high impedance data port termination (line 158) of the transmitter 116, an example of which is illustrated by line 190 in the chart of FIG. 5. The resonantly coupled noise, or rail-to-rail noise, at the data port 142 generally includes high frequency electrical signals having maximum and minimum voltages that respectively substantially correspond to proximate a high rail voltage corresponding to the supply voltage $V_S$ (e.g., 1.2 volts), and a low rail voltage corresponding to the common voltage 164 (0 volts). Such noise can interfere with the implementation of the receiver detect function performed by the receiver detector 170 of the prior art. As a result, false detections of the receiver 118 can occur resulting in data miscommunications.

Figure 6:
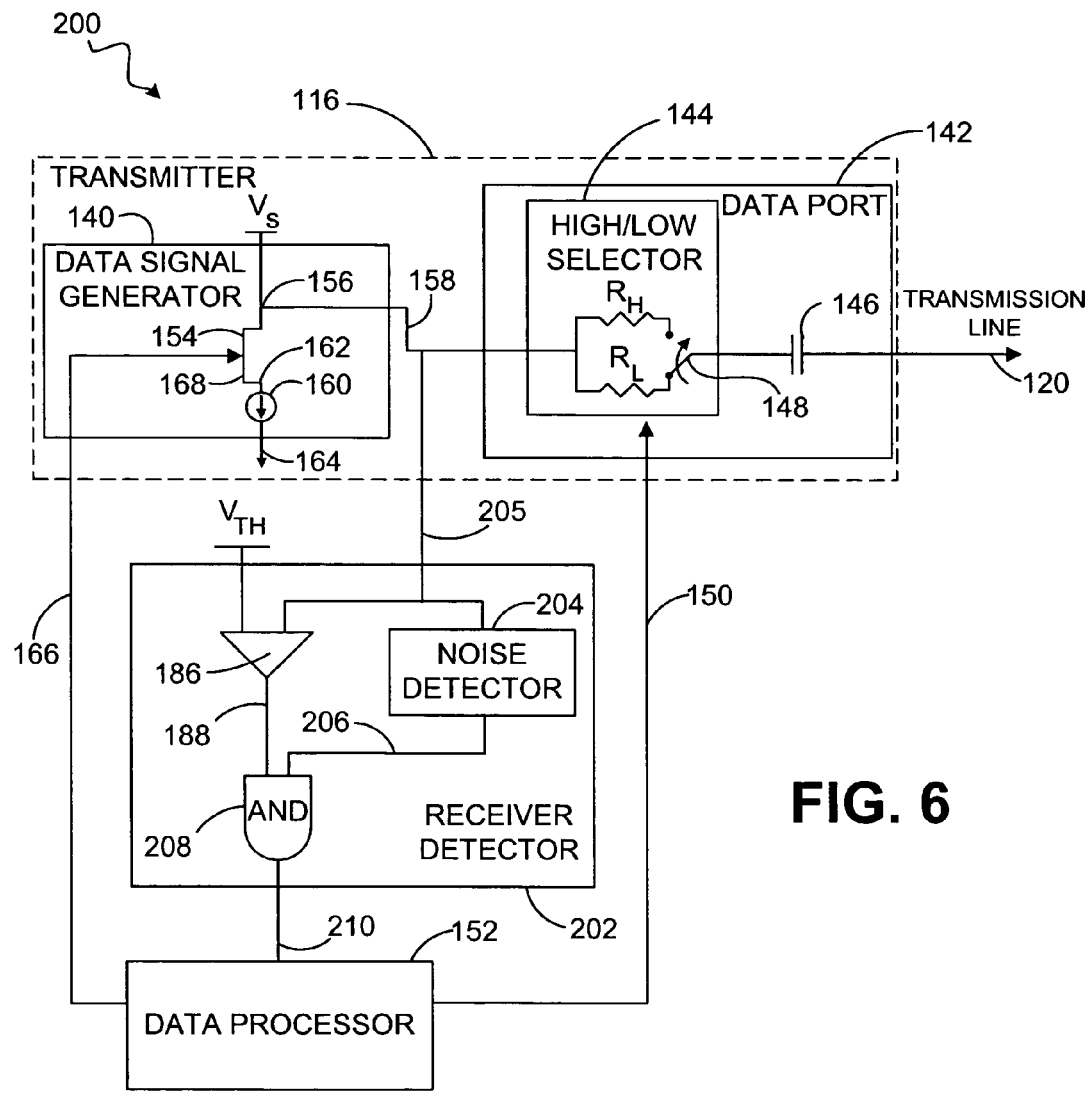
FIG. 6 is a schematic diagram illustrating a peripheral device in accordance with embodiments of the invention.

The peripheral device of the present invention can perform a receiver detect function even in the presence of high amplitude noise at the data port termination of the transmitter. FIG. 6 is a schematic diagram of a peripheral device 200 in accordance with embodiments of the invention. The receiver and other electronic components of device 200 are not shown to simplify the illustration and the discussion of the invention. Peripheral device 200 is preferably formed in accordance with the PCI-X specification and includes a transmitter 116 having a data signal generator 140, a data port 142, and a data processor 152 that substantially operate in the manner discussed above. Peripheral device 200 also includes a receiver detector 202 that allows for the detection of a receiver 118 coupled to the transmission line 120 even in the presence of resonantly coupled noise at the data port 142 (high impedance termination $R_H$ or at line 158). The receiver detector 202 performs a receiver detect function following the resetting of the data signal generator 140 by the data processor 152, through analysis of the receiver detect signal at the data port 142.

When the transmitter 116 is in the high impedance operating mode, the corresponding receiver 118 is known to be absent in the event that rail-to-rail noise 190 (FIG. 5) is detected at the data port 142 (line 158). In the event that rail-to-rail noise is not detected at the data port 142 while the transmitter 116 is in the high impedance operating mode, the standard receiver detect function can be performed as explained above by comparing the receiver detect signal or voltage at line 158 to a threshold voltage $V_{TH}$ using a comparator 186, after a predetermined period of time T has expired following the resetting of the data signal generator 140.

The receiver detector 202 of the present invention includes a noise detector 204 that is configured to detect rail-to-rail noise at the data port when the transmitter 116 is operating in the high impedance operating mode by monitoring line 158 through line 205. The noise detector 204 includes a noise detect output signal 206 that indicates the presence or absence of rail-to-rail noise at the data port 142.

In accordance with one embodiment, the noise detect output signal 206 is a logic one or high voltage when rail-to-rail noise is undetected, and is a logic zero or low voltage when rail-to-rail noise is detected at the data port 142. The noise detect output signal 206 can then be provided to an AND logic gate 208 for comparison with the receiver detect signal 188 from comparator 186 that operates as discussed above. Here, the receiver detect signal 188 is a logic one when a receiver 118 is detected as being present on the transmission line 120, and a logic zero when receiver detector 202 determines that no receiver 118 is connected to the transmission line 120. The AND logic gate 208 provides an output signal 210 to the data processor 152 that always indicates that the receiver is absent when the noise detect signal 206 is a logic zero and, otherwise, indicates the presence or absence of a receiver on the transmission line 120 in accordance with the determination of comparator 186.

Figure 7:
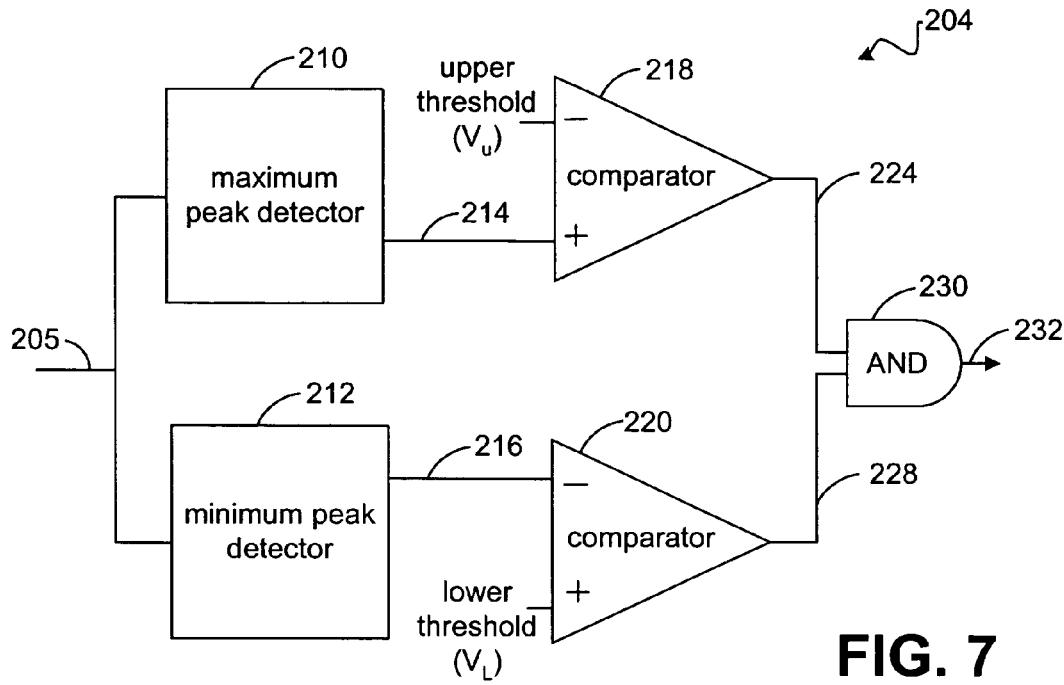
FIGS. 7 and 8 are schematic diagrams of noise detectors in accordance with embodiments of the invention.

FIG. 7 is a schematic diagram of a noise detector 204, in accordance with an embodiment of the invention, that includes a maximum peak detector 210 and a minimum peak detector 212. The maximum peak detector 210 has a maximum voltage output 214 that is indicative of a maximum voltage detected at the data port 142. The minimum peak detector 212 has a minimum voltage output 216 that is indicative of a minimum voltage detected at the data port 142. In accordance with one embodiment, noise detector 204 further includes high and low voltage comparators 218 and 220 that receive the maximum and minimum voltage outputs 214 and 216, respectively. The high voltage comparator 218 further receives an upper threshold input voltage $V_U$ and includes a high voltage compare output 224 that is indicative of whether the maximum voltage output 214 is less than, greater than, and/or equal to the upper threshold input voltage $V_U$. The low voltage comparator 220 receives a lower threshold input voltage $V_L$ and includes a low voltage compare output 228 that is indicative of whether the minimum voltage output 216 is less than, greater than, and/or equal to the lower threshold input voltage $V_L$. In accordance with one embodiment, the high voltage compare output 224 is a logic one when the maximum voltage output 214 is greater than the upper threshold input voltage $V_U$, and the low voltage compare output 228 is a logic one when the minimum voltage output 216 is less than the lower threshold input voltage $V_L$. As illustrated in FIG. 5, the upper threshold input voltage $V_U$ has a value that is selected to ensure detection of a peak voltage of the rail-to-rail noise that is proximate to the high voltage rail or the supply voltage $V_S$. Similarly, the lower threshold input voltage $V_L$ is selected to ensure detection of an anticipated minimum voltage of rail-to-rail noise that is proximate to the low voltage rail or the common voltage 164.

Noise detector 204 can also include a logic AND gate 230 that receives the high and low voltage compare outputs 224 and 228 and includes an output signal 232. The output signal 232 is a logic one when the maximum voltage output 214 and a minimum voltage output 216 are respectively above and below the upper and lower threshold input voltages $V_U$ and $V_L$ and, thus, are proximate to the high and low rail voltages, thereby indicating the presence of rail-to-rail noise at the data port 142. When signal 232 is a logic zero, rail-to-rail noise is not detected at the data port 142.

Figure 8:
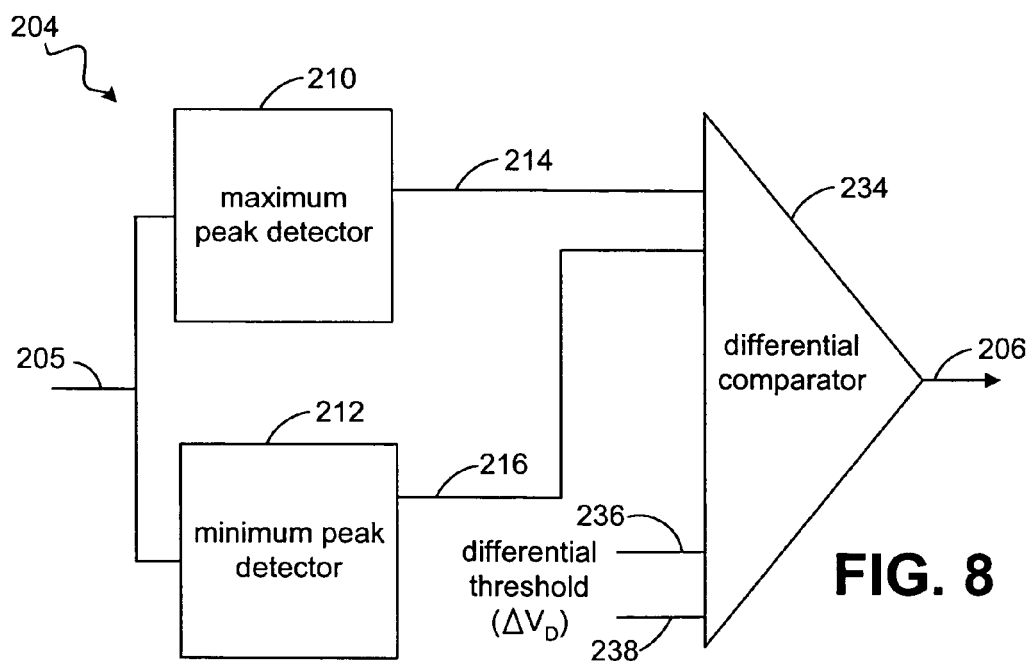

FIG. 8 is a schematic diagram of a noise detector 204 in accordance with another embodiment of the invention. This embodiment includes the maximum and minimum peak detectors 210 and 212 having maximum and minimum voltage outputs 214 and 216 as discussed above in the embodiment depicted in FIG. 7. Noise detector 204 also includes a differential comparitor 234 that is configured to compare a difference between the maximum and minimum voltage outputs 214 and 216 to a threshold difference $\Delta V_D$ (FIG. 5) between inputs 236 and 238, which preferably respectively corresponds to a difference between the upper and lower threshold input voltages $V_U$ and $V_L$ discussed above with reference to FIG. 6. In general, when the difference between the maximum and minimum voltage outputs 214 and 216 is greater than the threshold difference $\Delta V_D$, rail-to-rail noise is detected at the data port 142 and the receiver 118 is not connected to transmission line 120. Accordingly, differential comparator 234 can be configured to provide the noise detect signal 206 as a logic one when the difference between the maximum and minimum voltage outputs 214 and 216 is less than the threshold difference $\Delta V_D$, and output a logic zero when the difference between the maximum and minimum voltage outputs 214 and 216 exceed the threshold difference $\Delta V_D$.

It is to be understood that even though numerous characteristics and advantages of various embodiments of the invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Thus, the particular elements may vary depending on the particular application for the invention while maintaining substantially the same functionality and without departing from the scope and spirit of the invention. For example, the manner in which the method of the invention is implemented can take on many different forms including different circuit configurations. Additionally, a particular location at which a voltage of the data port of the peripheral device of the present invention is monitored to perform the receiver detect function can vary from that specified above.

What is claimed is:

1. A peripheral device for use in a computer system comprising:
   a data port having high and low impedance terminations;
   a transmitter having a data signal generator electrically coupled to the low impedance termination when in a low impedance operating mode, and electrically coupled to the high impedance termination when in a high impedance operating mode; and
   a receiver detector electrically coupled to the data port and including a noise detector adapted to detect a presence or an absence of rail-to-rail noise at the data port when the transmitter is in the high impedance operating mode, the rail-to-rail noise comprising a high frequency electrical signal having a voltage that substantially extends from proximate a high rail voltage to proximate a low rail voltage.

2. The device of claim 1, wherein the noise detector includes a noise detect output signal indicating the presence or absence of rail-to-rail noise at the data port.

3. The device of claim 1 including a data processor having a data control signal that controls the data generator and an impedance mode signal that selects either the high or the low impedance mode of the transmitter.

4. The device of claim 1 including:
   a maximum peak detector having a maximum voltage output that is indicative of a maximum voltage detected at the data port; and
   a minimum peak detector having a minimum voltage output that is indicative of a minimum voltage detected at the data port.

5. The device of claim 4, wherein the noise detector includes:
   a high voltage comparator receiving the maximum voltage output and an upper threshold input voltage, and having a high voltage compare output indicating whether the maximum voltage output is less than, greater than, or equal to the upper threshold input voltage; and
   a low voltage comparator receiving the minimum voltage output and a lower threshold input voltage, and having a low voltage compare output indicating whether the minimum voltage output is less than, greater than, or equal to the lower threshold input voltage;
   wherein rail-to-rail noise is present at the data port when the high and low voltage compare outputs respectively indicate that the maximum voltage output is greater than the upper threshold input voltage, and the minimum voltage output is less than the lower voltage threshold input voltage.

6. The device of claim 4, wherein the noise detector includes a differential comparator configured to compare a difference between the maximum and minimum voltage outputs to a threshold difference.

7. The device of claim 6, wherein the threshold difference substantially corresponds to a difference between the high and the low rail voltages.

8. The device of claim 1, wherein an impedance of the low impedance line is approximately 50 ohms.

9. The device of claim 1, wherein the impedance of the high impedance line is more than approximately 5 kiloohms.

10. The device of claim 1, wherein the peripheral device is formed in accordance with a Peripheral Component Interconnect Express (PCI-X) standard.

11. The device of claim 1 including a receiver.

12. The device of claim 1, wherein the device is formed as a compact disc (CD) player and/or recorder, a digital video disc (DVD) player and/or recorder, a disc drive, or a modem.

13. A computer system comprising:
   a central processing unit;
   a system controller in electrical communication with the central processing unit;
   a PCI bus in electric communication with the system controller; and
   the peripheral device of claim 2 wherein the data processor is electrically coupled to the system controller through the PCI bus.

14. In a computer system, a method of detecting an electrical connection between a data port of a transmitter of a peripheral device and a receiver when the data port is in a high impedance operating mode, the method comprising detecting a presence of rail-to-rail noise at the data port, the rail-to-rail noise comprising a high frequency electrical signal having a voltage that substantially extends from proximate a high rail voltage to proximate a low rail voltage of the transmitter.

15. The method of claim 14, wherein the detecting of rail-to-rail noise includes:
   detecting a maximum voltage at the data port; and
   detecting a minimum voltage at the data port.

16. The method of claim 15, wherein the detecting of rail-to-rail noise includes:
   comparing the maximum voltage to an upper threshold input voltage; and
   comparing the minimum voltage to a lower threshold input voltage;
   wherein rail-to-rail noise is detected at the data port when the maximum voltage is greater than the upper threshold input voltage, and the minimum voltage is less than the lower threshold voltage.

17. The method of claim 15, wherein the detecting of rail-to-rail noise includes comparing a difference between the maximum and minimum voltages to a threshold difference.

18. The method of claim 17, wherein the threshold difference substantially corresponds to a difference between the high and low rail voltages.

* * * * *